(12) United States Patent
Lee (10) Patent No.: US 7,193,584 B2
(45) Date of Patent: Mar. 20, 2007

(54) WEARABLE DISPLAY APPARATUS

(75) Inventor: Jong-hwan Lee, Yongin (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 256 days.

(21) Appl. No.: 10/029,986

(22) Filed: Dec. 31, 2001

(65) Prior Publication Data

US 2002/0113755 A1 Aug. 22, 2002

(30) Foreign Application Priority Data

Feb. 19, 2001 (KR) ................... 2001-8241

(51) Int. Cl.
*G09G 5/00* (2006.01)
(52) U.S. Cl. ............................. 345/7; 345/8
(58) Field of Classification Search .............. 345/7, 345/8, 9, 11, 630, 100, 419; 349/11; 359/630, 359/462, 324, 465, 464, 466, 742, 815, 443; 348/51, 53, 54, 115, 744; 351/201; 434/44
See application file for complete search history.

(56) References Cited

U.S. PATENT DOCUMENTS

| | | | | |
|---|---|---|---|---|
| 5,347,400 A * | 9/1994 | Hunter | ............. | 359/815 |
| 5,751,259 A * | 5/1998 | Iwamoto | ............. | 345/8 |
| 5,764,341 A * | 6/1998 | Fujieda et al. | ............. | 351/221 |
| 5,774,096 A * | 6/1998 | Usuki et al. | ............. | 345/8 |
| 5,781,165 A * | 7/1998 | Tabata | ............. | 345/8 |
| 5,880,773 A * | 3/1999 | Suzuki | ............. | 348/115 |
| 5,907,431 A * | 5/1999 | Stuttler | ............. | 359/379 |
| 5,973,831 A * | 10/1999 | Kleinberger et al. | ............. | 359/465 |
| 6,076,929 A * | 6/2000 | Stuttler | ............. | 351/211 |
| 6,144,347 A * | 11/2000 | Mizoguchi et al. | ............. | 345/8 |
| 6,151,061 A * | 11/2000 | Tokuhashi | ............. | 348/51 |
| 6,160,666 A * | 12/2000 | Rallison et al. | ............. | 359/630 |
| 6,266,041 B1 * | 7/2001 | Cairns et al. | ............. | 345/100 |
| 6,388,639 B1 * | 5/2002 | Hoshino et al. | ............. | 345/8 |
| 6,445,365 B1 * | 9/2002 | Taniguchi et al. | ............. | 345/9 |
| 6,448,944 B2 * | 9/2002 | Ronzani et al. | ............. | 345/8 |
| 6,518,939 B1 * | 2/2003 | Kikuchi | ............. | 345/8 |
| 6,532,008 B1 * | 3/2003 | Guralnick | ............. | 345/419 |
| 6,535,183 B2 * | 3/2003 | Melville et al. | ............. | 345/8 |
| 6,545,650 B1 * | 4/2003 | Yamada et al. | ............. | 345/7 |
| 6,751,020 B2 * | 6/2004 | Sugawara | ............. | 359/462 |
| 2001/0015847 A1 * | 8/2001 | Sugawara | ............. | 359/462 |
| 2002/0041259 A1 * | 4/2002 | Lewis et al. | ............. | 345/7 |

* cited by examiner

*Primary Examiner*—Nitin Patel
(74) *Attorney, Agent, or Firm*—Staas & Halsey LLP (57) ABSTRACT

A wearable display apparatus adjusting image display positions fit for an interpupillary distance of a user. The wearable display apparatus has a main control unit outputting view display position adjustment information corresponding to inputted interpupillary distance setting information and display units display-processing image information inputted to an area within a display region which is smaller than an entire view display area corresponding to the view display position adjustment information. With the wearable display apparatus, simplification in structure and convenience in use, are provided since image display positions may be adjusted to fit an interpupillary distance of a user without movements of optic systems.

12 Claims, 5 Drawing Sheets

WEARABLE DISPLAY APPARATUS

CROSS-REFERENCE TO RELATED APPLICATIONS

This application claims the benefit of Korean Application No. 2001-8241, filed Feb. 19, 2001, in the Korean Industrial Property Office, the disclosure of which is incorporated herein by reference.

BACKGROUND OF THE INVENTION

1. Field of the Invention

The present invention relates to a wearable display apparatus, and more particularly, to a wearable display apparatus configured for interpupillary distances, allowing left and right image display positions to be adjusted for a user's interpupillary distance.

2. Description of the Related Art

A wearable display apparatus is worn near a user's eyes for viewing images. The wearable display apparatus is widely spread in use due to advantages of being individually wearable, small in size, and providing views of a wide visual angle. Generally, a head mount display (HMD) apparatus, and a spectacles-type display apparatus are types of wearable display apparatuses. The wearable display apparatus is magnified by an optical system and shows a user images displayed on a display device such as an LCD or a CRT. The wearable display apparatus requires very precise optical devices to focus at short distances and avoid eye fatigue since an image screen of the wearable display apparatus is disposed at a position close to the eyes.

Particularly, in view of eyes which are visual subjects, the HMD apparatus is classified into a monocular type and a binocular type. Further, in view of images which are visual objects, the HMD apparatus is classified into a monoscopic type and a stereoscopic type. Of the above, the binocular type is widely used.

For left and right images displayed in the HMD apparatus of the binocular type to be naturally overlapped and recognized by a user, a distance between focusing lenses of the HMD may be adjusted for the interpupillary distance (IPD) of the user. The IPDs of most adult males and females range from 50 mm to 74 mm. Further, some people have different heights in their left and right eyes. If a user wears a binocular HMD differently adjusted from his or her own IPD, left and right images are initially viewed as separated. Also, the images are overlapped in one image by the visual control mechanism of a human being, thereby increasing eye fatigue more than in the case that the IPD of the HMD is adjusted to fit the user's IPD. Accordingly, a method has been disclosed in WO95/10106 by Vertula Vision Inc., in which an optical mechanism is mechanically adjusted to focus left and right images according to a user's diverse interpupillary distances.

Figure 1:
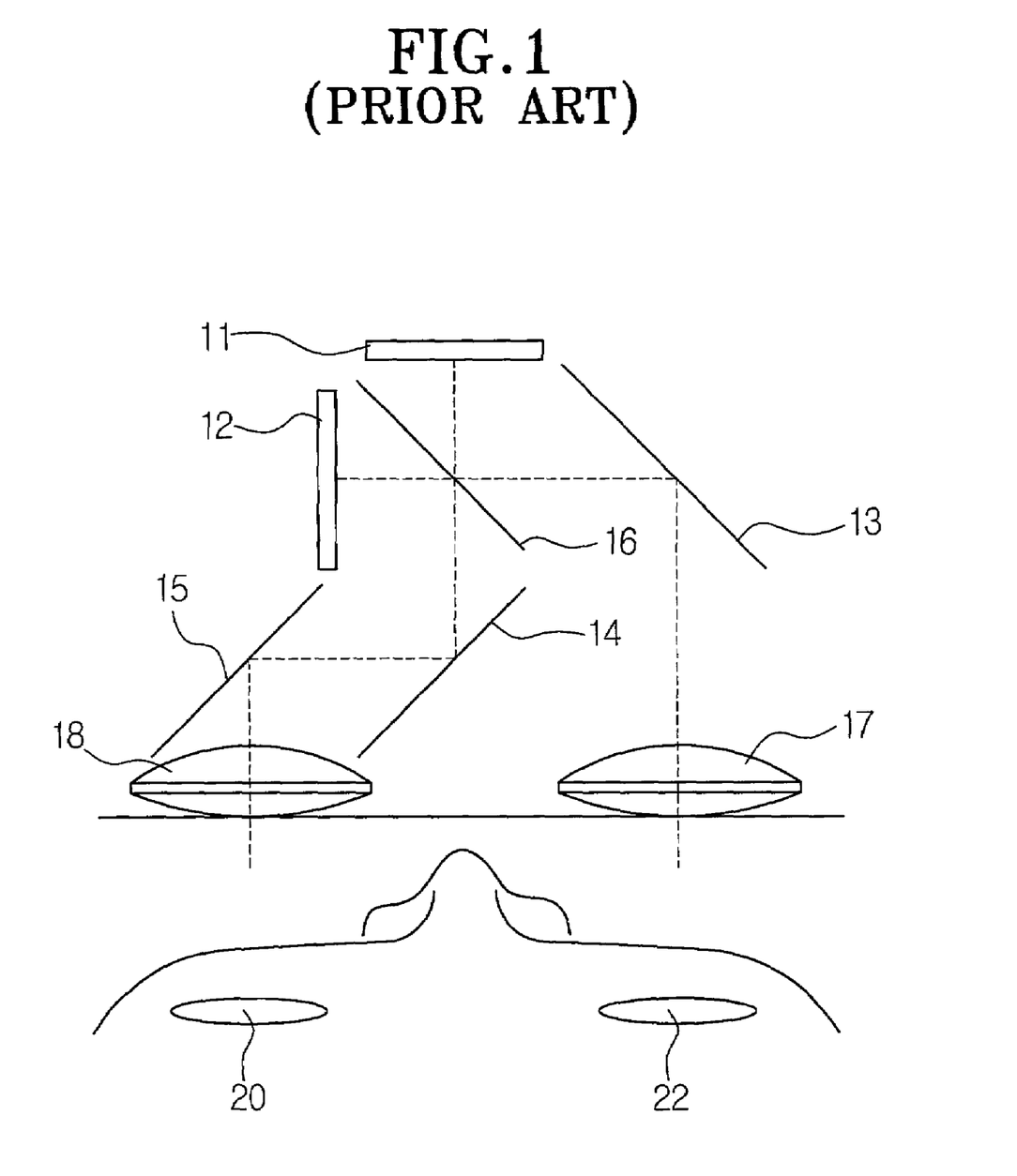
FIG. 1 is a view showing a conventional wearable display apparatus.

FIG. 1 is a view showing a conventional wearable display apparatus.

Referring now to FIG. 1, the conventional HMD includes two display devices 11 and 12, plural mirrors 13, 14, and 15, a beam splitter 16, and focus lenses 17 and 18.

The display devices 11 and 12 display images to be projected to the left and right eyes 20 and 22 of a user.

The focus lenses 17 and 18 are disposed in front of the eyes 20 and 22 of the user, and magnify the images displayed on the display devices 11 and 12 so that the magnified images are provided for the user's eyes.

The plural mirrors 13, 14, and 15 and the beam splitter 16 are used to transform projection paths of the images displayed on the display devices 11 and 12 to the positions of the left and right eyes.

The image displayed on the display devices 11 and 12 are viewed by the user's left and right eyes 20 and 22 via the beam splitter 16, mirrors 13, 14, and 15, and focus lenses 17 and 18. The images projected to the left and right eyes 20 and 22 through the right focus lens 17 and the left focus lens 18 are mutually superimposed and the user recognizes the images as one image.

However, the conventional binocular HMD has a drawback in that the IPD is fixed to an average IPD of users, or the optical system of the HMO has to be mechanically adjusted according to an IPD of the particular user. Thus, for example, the structure of the HMD becomes complicated and the head set becomes heavy in weight.

SUMMARY OF THE INVENTION

Accordingly, it is an object of the present invention to provide a wearable display apparatus configured for interpupillary distances, allowing left and right image display positions to be easily adjusted according to a user's interpupillary distance without an increase of the completeness degree in structure.

Additional objects and advantages of the invention will be set forth in part in the description which follows, and, in part, will be obvious from the description, or may be learned by practice of the invention.

The foregoing and other objects of the present invention are achieved by providing a wearable display apparatus worn near both eyes of a user and displaying images to be recognized through the eyes, including a main control unit outputting view display position adjustment information corresponding to inputted interpupillary distance setting information, and display units respectively display-processing image information inputted to an area within a display region corresponding to the view display position adjustment information, the display region being smaller than an entire view display area of the display units.

A key input unit is further provided which is capable of producing the interpupillary distance setting information in correspondence with a user's manipulation.

Alternatively, a sensor is further provided which is mounted on the main body, detecting information on a user's interpupillary distance and outputting the detected interpupillary distance information to the main control unit as the interpupillary distance setting information.

The display unit includes a first display device mounted on the main body to display an image to a left eye of the user, and a second display device mounted on the main body to display an image to a right eye of the user, the first and second display devices each having a matrix display unit displaying pixel information by selective driving of column electrodes and row electrodes. The row electrodes are arranged along a horizontal direction, and the column electrodes are arranged along a direction crossed at a certain angle with respect to the horizontal direction. Also, the first and second display devices each have a display control unit selectively driving the column electrodes and the row electrodes to display the image at a view display position corresponding to the view display position adjustment information.

A display area of the matrix display unit is larger at a length in a horizontal direction corresponding to a direction linking wearing of the left and right eyes than an internally set image display size.

The display control unit includes a row electrode driving unit selecting the row electrodes and outputting image information and a column electrode driving unit sequentially activating the column electrodes. Also, the display control unit includes a drive control unit controlling the column electrode driving unit and the row electrode driving unit for image data to be written to the column and row electrodes corresponding to the view display position adjustment information.

The column electrode driving unit includes a plurality of flip-flops connected in series with correspondence to a number of the column electrodes, and a switch unit mounted to output to the corresponding column electrodes, image signals outputted from the drive control unit according to a signal outputted from an output port of the plurality of flip-flops.

The row electrode driving unit includes a plurality of flip-flops arranged in series in correspondence to a number of the row electrodes, and each having an output port connected to the corresponding row electrode.

Alternatively, the display control unit includes a row electrode driving unit selecting the row electrodes and outputting image information and a column electrode driving unit sequentially activating the column electrodes. Also, the display control unit includes a drive control unit controlling the column electrode driving unit and the row electrode driving unit for image data to be written to the column and row electrodes corresponding to the view display position adjustment information.

The row electrode driving unit includes a plurality of flip-flops connected in series with correspondence to a number of the row electrodes, and a switch unit mounted to output to the corresponding row electrode, image signals outputted from the drive control unit according to a signal outputted from an output port of the plurality of flip-flops.

The column electrode driving unit includes a plurality of flip-flops arranged in series in correspondence to a number of the row electrodes, and having an output port connected to the corresponding row electrode.

The foregoing and other objects of the present invention are also achieved by providing a method of controlling a wearable display apparatus worn near to both eyes of a human body and displaying images to be recognized through the eyes, including outputting view display position adjustment information corresponding to inputted interpupillary distance setting information and display-processing image information inputted to an area within a display region corresponding to the view display position adjustment information, the display region being smaller than an entire view display area of the display units.

The interpupillary distance setting information is produced in correspondence with a user's manipulation.

The interpupillary distance setting information is information on a user's interpupillary distance detected by a sensor mounted in a main body.

BRIEF DESCRIPTION OF THE DRAWINGS

These and other objects and advantages of the invention will become apparent and more appreciated from the following description of the preferred embodiments, taken in conjunction with the accompanying drawings of which.

DETAILED DESCRIPTION OF THE PREFERRED EMBODIMENTS

Reference will now be made in detail to the present preferred embodiments of the present invention, examples of which are illustrated in the accompanying drawings, wherein like reference numerals to like elements throughout.

Figure 2:
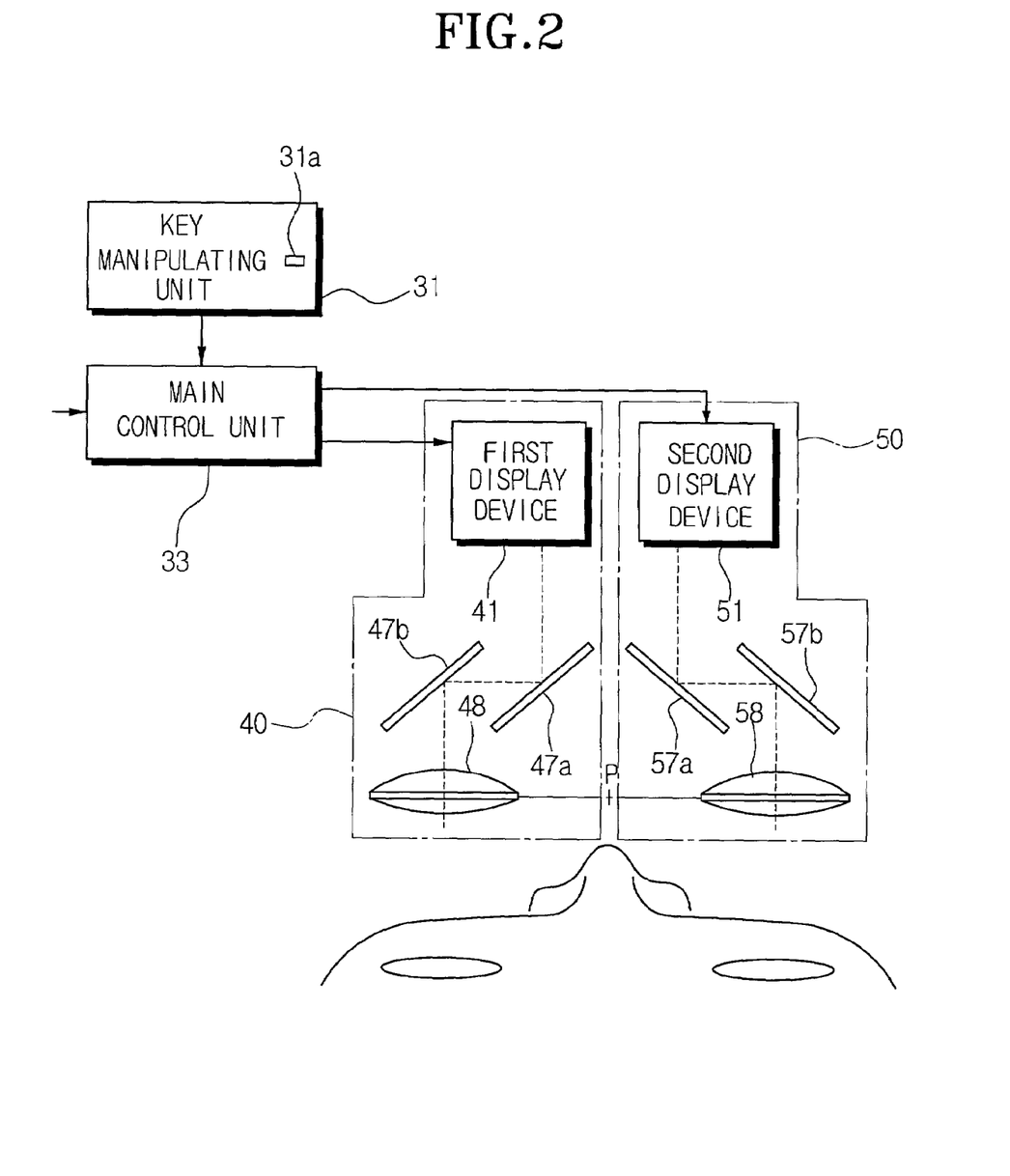
FIG. 2 is a view showing schematically a wearable display apparatus according to an embodiment of the present invention.

FIG. 2 is a view showing a wearable display apparatus according to an embodiment of the present invention.

Referring now to FIG. 2, the wearable display apparatus includes a key manipulating unit 31, a main control unit 33, and first and second display units 40 and 50.

The key manipulating unit 31 has an interpupillary distance adjusting key 31a capable of setting an interpupillary distance fit for a user.

Alternatively, a sensor (not shown) may be mounted on a main body, which detects interpupillary positions of the user wearing the wearable display apparatus and outputting interpupillary distance information to the main control unit 33 to automatically set the interpupillary distance fit for the user. The sensor, which is known, may be used and generally employed in eyesight measuring equipment.

The main control unit 33 produces and outputs view display position adjustment information corresponding to interpupillary distance setting information inputted through the key manipulation unit 31 or the sensor to be fit for the display units 40 and 50.

Alternatively, the main control unit 33 is constructed to interface with an external device (not shown) to output the view display position adjustment information corresponding to the interpupillary distance setting information inputted from the external device. In this case, the external device is constructed to output the interpupillary distance setting information that is recognizable by the main control unit 33. For example, in the case that a head-mount display apparatus is connected and used together with a computer, the computer has an interpupillary distance adjustment driver with which the user sets the interpupillary distance in the computer and transfers the set interpupillary distance information to the main control unit 33.

The main control unit 33 determines image display positions corresponding to the interpupillary distance information inputted from the key manipulating unit 31, sensor, or external device to produce an image of a size set to be smaller than an entire image display area displayable on first and second display devices 41 and 51. Then, the main control unit 33 outputs the view display position information, which corresponds to the determined image display positions, to the corresponding display units 40 and 50. Here, the view display position information includes display start position information for an image display of the entire view to be started.

Figure 3:
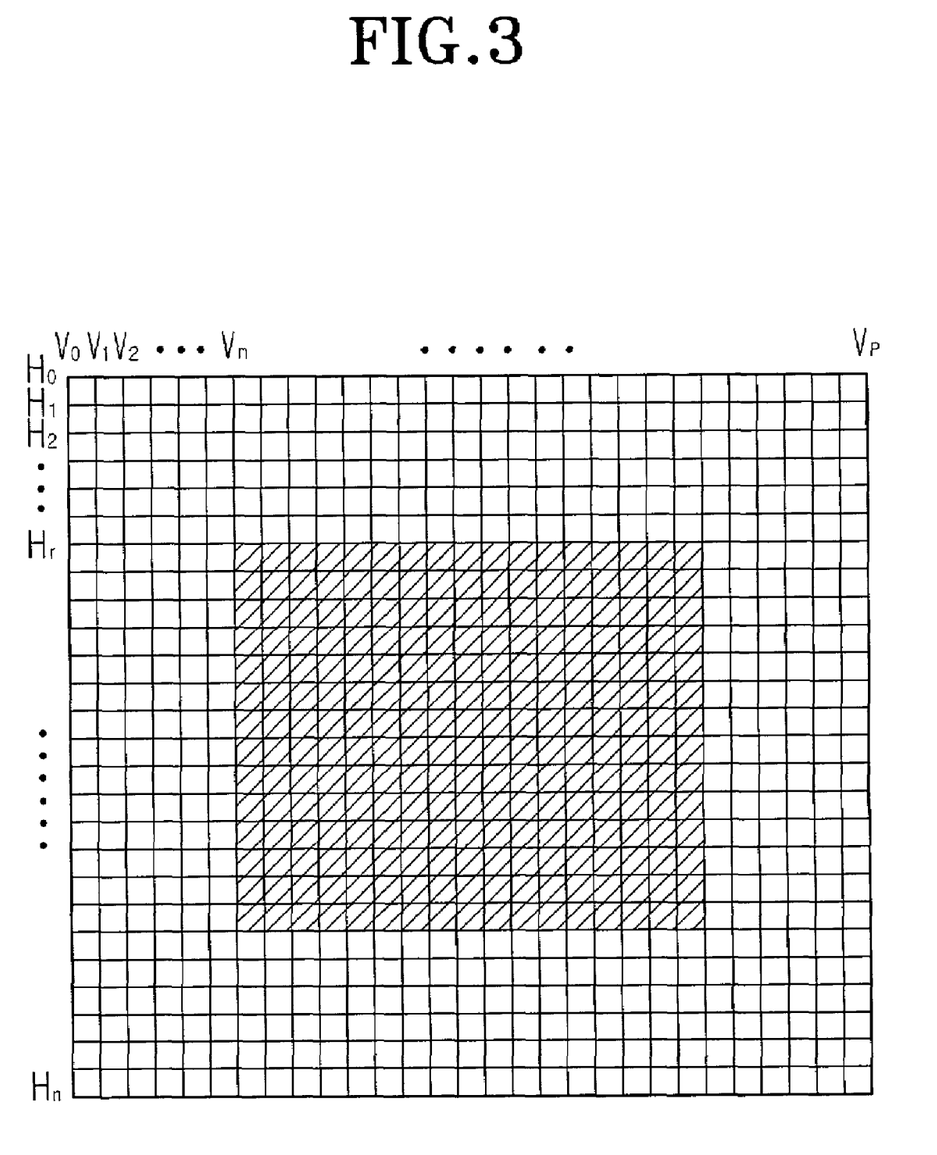
FIG. 3 is a view showing a relationship between an entire display area and an image display size of the wearable display apparatus of FIG. 2.

FIG. 3 is a view showing a relationship between an entire display area and an image display size of the wearable display apparatus of FIG. 2.

Referring now to FIG. 3, for example, if pixel information is written in a matrix form to an entire display area of a display device, the main control unit 33 determines on which area an image display size, the size of the shaded portion which is set to be smaller than the entire display area, is displayed according to the user's interpupillary distance. If the image display position as shown is determined, the main control unit 33 outputs to a corresponding display device, position information of writing an image from an mth column Vm and an rth row Hr of the entire display area. Likewise, if an image is displayed at a position starting from a second column and a third row according to a changed interpupillary distance of the user, the main control unit 33 outputs the second column and the third row as position information for the writing of an image to be started. In this case, the display area for the image size of the shaded portion is the area displayed from the second column V2 and the third row H3, causing the display position to move.

Also, as shown in FIG. 2, the first display unit 40 has the first display device 41 displaying a left-eye image according to the view display position adjustment information inputted from the main control unit 33, and a first optic system outputting the image displayed from the first display device 41 to the user's left eye.

The first display device 41 may be one of many known diverse display devices such as a liquid crystal device (LCD), a light-emitting device array display device, a plasma display device, and a CRT device.

A view display area of the first display device 41 is larger at a length in horizontal and/or vertical directions which are directions linking the wearing positions of the left and right eyes, than an internally set image display size (see FIG. 3). That is, for example, the view display area of the first display device 41 has a view display area which displaces the internally set image display size within a certain range.

The first optic system includes reflection mirrors 47a and 47b and a focus lens 48 to output the image displayed on the first display device 41 to the left eye. The first optic system may further include an optic device (not shown) compensating an image distortion.

Alternatively, the first optic system may be constructed with an optical device applied to display at the left eye position, an image displayed on the first display device 41 by another light path change method.

The second display unit 50 is controlled by the main control unit 33, and includes the second display device 51 displaying an image for a right eye and a second optic system outputting the image displayed by the second display device 51 to the user's right eye.

The second display device 51 may be one of many known diverse display devices such as a liquid crystal device (LCD), a light-emitting array display device, a plasma display device, and a CRT device.

A view display area of the second display device 51 is larger at a length in horizontal and/or vertical directions which are directions linking the wearing positions of the left and right eyes, than an internally set image display size. That is, for example, the view display area of the second display device 51 has a view display area which displaces the internally set image display size within a certain range. In this case, the positions of the images displayed on the first and second display devices 41 and 51 may be symmetrically adjusted with reference to a center point P between the focus lens 48 of the first optic system and a focus lens 58 of the second optic system.

Alternatively, the view display area of the first display device 41 may be formed to correspond to the set image display size, and the view display area of the second display device 51 may be formed for the image-displayable area to be expanded to a size larger than the set image display size. In this case, the position displayed on the second display device 51 through the second optic system is adjusted with reference to the position displayed on the first display device 41 through the first optic system.

Still alternatively, the view display area of the second display device 51 may be formed to correspond to the set image display size, and the view display area of the first display device 41 may be formed for the image-displayable area to be expanded to a size larger than the set image display size.

The second optic system includes reflection mirrors 57a and 57b outputting the image displayed on the second display device 51 and the focus lens 58. Likewise, the second optic system may have an additional optic device (not shown) compensating an image distortion, or an optical device applied to display at the right-eye position, an image displayed on the second display device 51 by another light path change method.

Hereinafter, operations will be described to show control of the view display positions to fit the user according to the adjustment information on the user's interpupillary distance in the wearable display apparatus.

Figure 4:
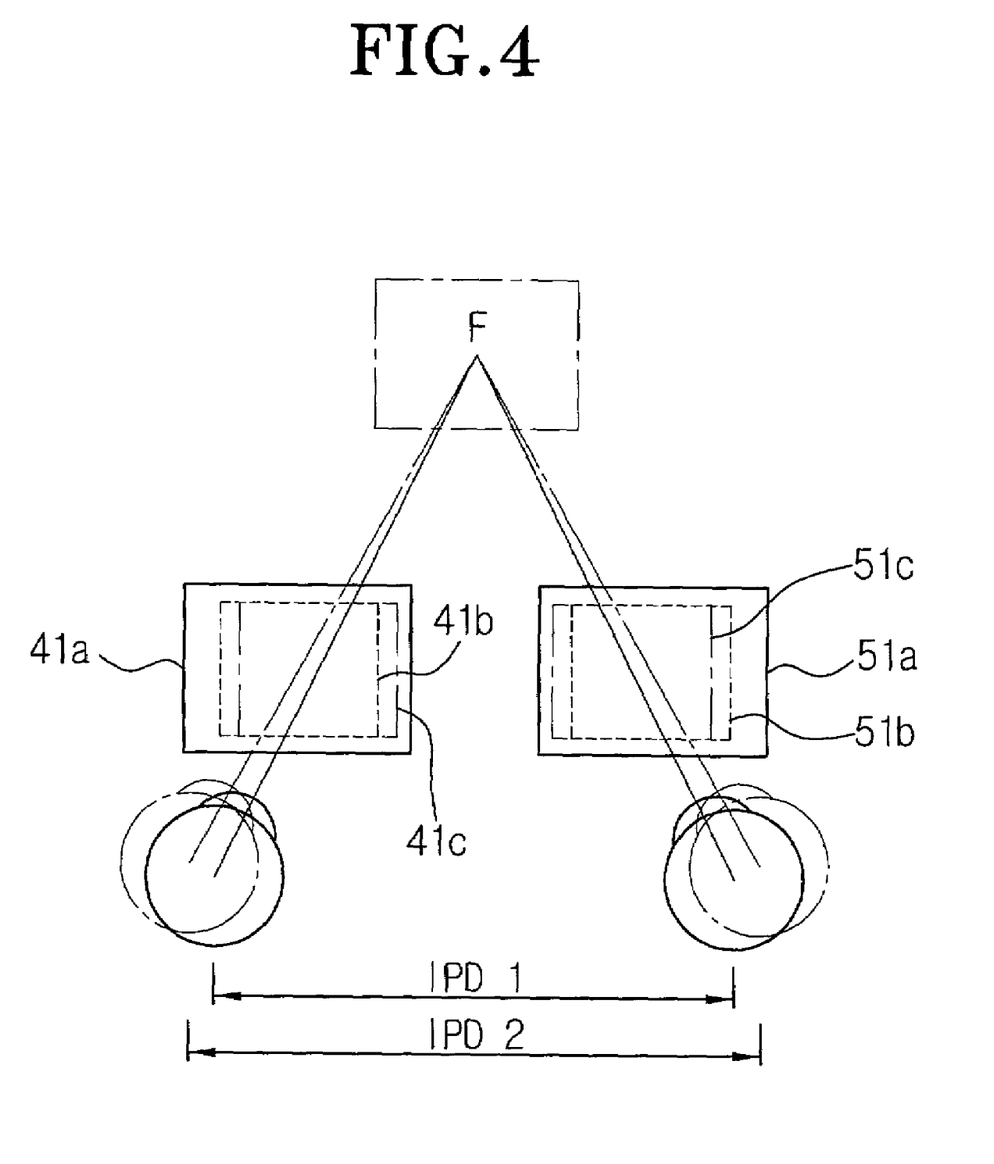
FIG. 4 is a view showing display positions of left and right eyes adjusted to fit a user's interpupillary distance in the wearable display apparatus of FIG. 2.

FIG. 4 is a view showing display positions of left and right eyes adjusted to fit a user's interpupillary distance in the wearable display apparatus of FIG. 2.

Referring now to FIG. 4 image positions respectively viewed to the left and right eyes of a user, move according to the user's interpupillary distance. The entire displayable areas 41a and 51a are schematically shown, which may be provided to the user through the respective optic systems with correspondence to the entire display areas of the first and second display devices 41 and 51. F shows a focus position determined by the respective optic systems.

In the case that a standard interpupillary distance is IPD1, image display areas 41b and 51b are shown in dotted lines, which correspond to display positions for mutually superimposing at the focus position F, the left-eye and right-eye images recognized by the user through the display devices 41 and 51 and the optic systems.

Accordingly, if images are displayed on the areas 41b and 51b of the display devices 41 and 51 corresponding to the image display positions shown in dotted lines in which the user has the standard interpupillary distance IPD1, the user recognizes that one superimposed image is provided through the left and right eyes at the focus position F, avoiding image recognition distortions and eye fatigue.

In the case that a user having an IPD2 different from the user having the IPD1 wears the wearable display apparatus, if the display position is not adjusted for the left-eye and right-eye images recognized through the left and right eyes, a position mutually superimposing the left-eye and right-eye images deviates from the focus position F. To compensate for the deviation, if the display position moves to the positions shown in one-dot chain lines, 41C and 51C which is the image display position fit for the user having the interpupillary distance IPD2, the user may experience one superimposed image recognized by both eyes at the focus position F without eye fatigue.

The method of adjusting the image display areas is the same in the respective display devices 41 and 51. Accordingly, a display example will be described with reference to FIG. 5 to show the operation of adjusting the image display positions according to view display position information inputted from the main control unit 33.

Figure 5:
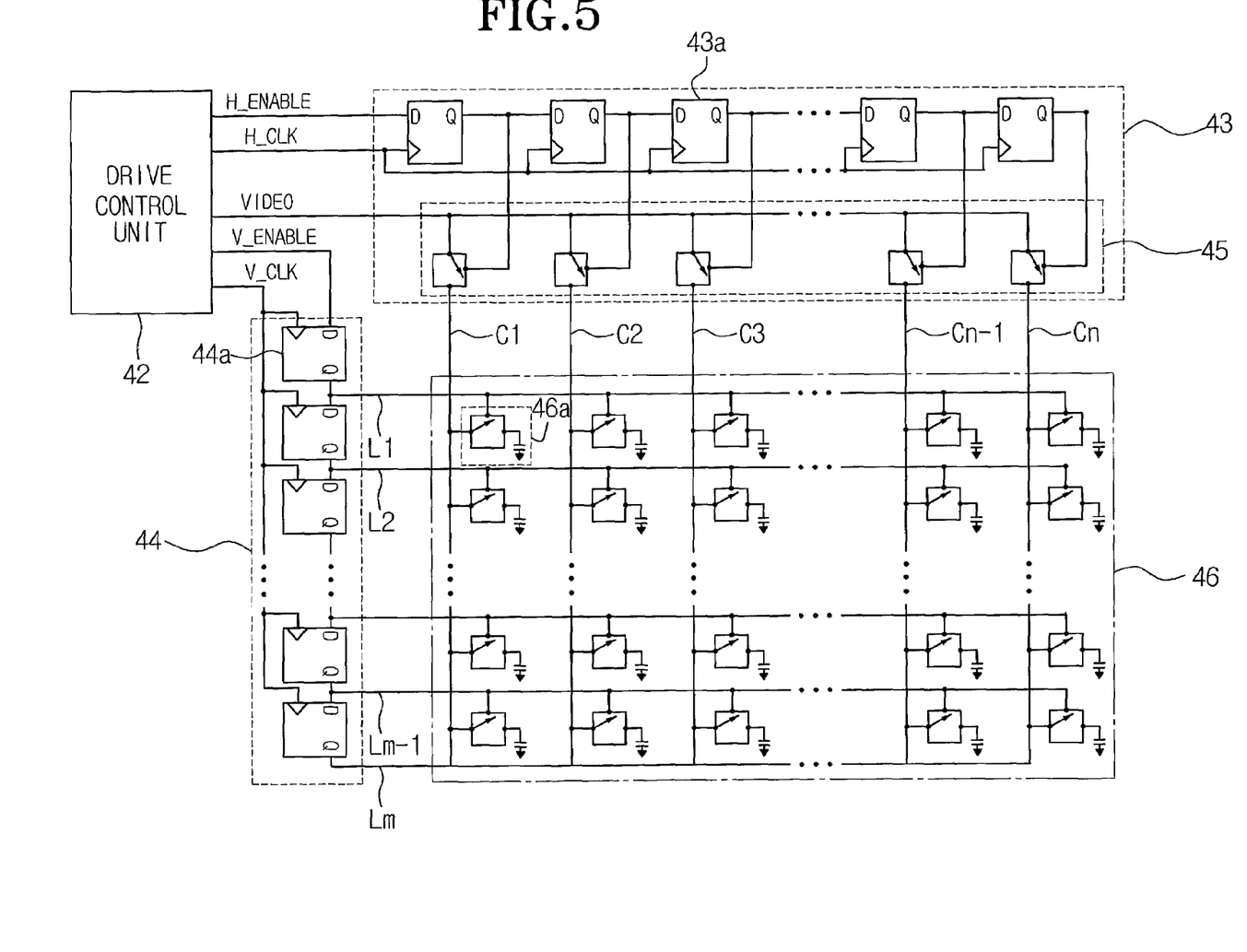
FIG. 5 is a view showing an example of a display device of the wearable display apparatus of FIG. 2.

FIG. 5 is a view showing an example of a display device of the wearable display apparatus of FIG. 2.

Referring now to FIG. 5, the display device includes a drive control unit 42, a column electrode driving unit 43, a row electrode driving unit 44, and a matrix display unit 46.

A display control unit includes the drive control unit 42, the column electrode driving unit 43, and the row electrode driving unit 44.

The matrix display unit 46 has column electrodes C and row electrodes L arranged in intervals, in which the row electrodes L are arranged in a line form in the horizontal direction and the column electrodes C are arranged in a line form along the direction crossed at a certain angle with respect to a horizontal direction. Liquid crystals or light-emitting devices may be applied between the column electrodes C and the row electrodes L. An equivalent circuit 46a for the liquid crystal is shown which transmits or blocks light according to the driving of the column electrodes C and the row electrodes L.

The column electrode driving unit 43 is provided with plural flip-flops 43a connected in series, and a switch unit 45 selectively outputting through a corresponding column electrode C, image data inputted according to output signals of the flip-flops 43a.

The row electrode driving unit 44 has plural flip-flops 44a connected in series and having output ports connected to the corresponding row electrodes L.

The drive control unit 42 controls the column electrode driving unit 43 and the row electrode driving unit 44 for an image to be displayed from image display start positions corresponding to view display position information inputted from the main control unit 33. H_ENABLE is a signal enabling the flip-flops to sequentially output activations signals (for example, high signals), and H_CLK is a horizontal scanning clock signal which is generated in synchronization with horizontal scanning. V_ENABLE is a signal enabling the flip-flops to sequentially output activation signals (for example, high signals), V_CLK is a vertical scanning clock signal which is generated in synchronization with vertical scanning, and VIDEO is an image signal.

The driving operations of the display device are described as follows. If view display position information is inputted from the main control unit 33 to start an image from a fifth column and a third row, the drive control unit 42 generates clock signals H_CLK and V_CLK in accordance with a usually set scanning mode through the flip-flops 43a and 44a of the column electrode driving unit 43 and row electrode driving unit 44. A flip-flip corresponding to the third row electrode outputs an activation signal and a flip-flop corresponding to the fifth column outputs an activation signal, to thereby output image information through the switch unit 45. That is, for example, the drive control unit 42 counts the horizontal and vertical clock signals and outputs image data for an image to be outputted through the switch from a time where the counting corresponds to an image-writing start position. Accordingly, the image starts to write from the third row and the fifth column.

Alternatively, for example, for a signal corresponding to image information to be outputted through the row electrode driving unit 44, the switch unit 45 may be placed in the row electrode driving unit 44. That is, for example, a structure may be constructed in which the switch unit 45 is removed from the column electrode driving unit 43 to directly connect the output ports of the respective flip-flops with the column electrodes. Therefore, the output ports of the flip-flops of the row electrode driving unit 44 may turn on and off the switch unit 45 capable of inputting image information.

A method of controlling a wearable display apparatus according to the present invention includes the operations of outputting view display position adjustment information and processing image information for displays. The view display position adjustment information output operation outputs view display position adjustment information corresponding to inputted interpupillary distance setting information. The image information display processing operation display-processes image information inputted to an area within a display region corresponding to the view display position adjustment information. Here, the display region is smaller than an entire view display area.

The interpupillary distance setting information may be produced in correspondence with a user's manipulation. Alternatively, the interpupillary distance setting information may be information on a user's interpupillary distance detected by a sensor.

With the wearable display apparatus described according to the present invention, simplification in structure and convenience in use are provided since image display positions may be adjusted to fit an interpupillary distance of a user without movements of optic systems.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A wearable display apparatus worn near left and right eyes of a user and to display images to be recognized through the left and right eyes, comprising:
   a main control unit outputting view display position adjustment information corresponding to inputted interpupillary distance setting information indicative of an interpupillary distance between the left and right eyes, and adjusting an image display position based on the view display position adjustment information; and
   display units respectively display-processing image information inputted to an area within a display region corresponding to the view display position adjustment information, the display region being smaller than an entire view display area of the display units,
   wherein the display units comprise:
      a first display unit having a first display device mounted on a main body to display an image to the left eye of the user, and a second display unit having a second display device mounted on the main body to display an image to the right eye of the user,
      said first and second display device each comprising:
         a matrix display unit displaying pixel information by selective driving of row electrodes and column electrodes, the row electrodes being arranged along a horizontal direction, and the column electrodes being arranged along a direction crossed at an angle with respect to the horizontal direction; and
         a display control unit selectively driving the row electrodes and the column electrodes to display the image at a view display position corresponding to the view display position adjustment information.

2. The wearable display apparatus as claimed in claim 1, further comprising:
a key input unit producing the interpupillary distance setting information in correspondence with a manipulation by the user.

3. The wearable display apparatus as claimed in claim 1, further comprising:
a sensor mounted on a main body, detecting the interpupillary distance of the user, and outputting the interpupillary distance setting information to the main control unit.

4. The wearable display apparatus as claimed in claim 1, wherein a display area of the matrix display unit is larger at a length in a horizontal direction corresponding to a direction linking a wearing position of the left and right eyes than an internally set image display area.

5. The wearable display apparatus as claimed in claim 1, wherein the display control unit comprises:
a column electrode driving unit selecting the column electrodes and outputting image information;
a row electrode driving unit sequentially activating the row electrodes; and
a drive control unit controlling the row electrode driving unit and the column electrode driving unit to write image data to the row and column electrodes corresponding to the view display position adjustment information.

6. The wearable display apparatus as claimed in claim 5, wherein the column electrode driving unit comprises:
a plurality of flip-flops connected in series, each of the plurality of flip-flops corresponding to one of the column electrodes; and
a switch unit mounted to output to the corresponding column electrodes, image signals outputted from the drive control unit according to a signal outputted from an output port of the corresponding one of the plurality of flip-flops.

7. The wearable display apparatus as claimed in claim 6, wherein the row electrode driving unit comprises a plurality of flip-flops arranged in series, each of the plurality of flip-flops corresponding to one of the row electrodes, and having an output port connected to the corresponding row electrode.

8. The wearable display apparatus as claimed in claim 6, wherein the column electrode driving unit comprises a plurality of flip-flops arranged in series, each of the plurality of flip-flops corresponding to one of the row electrodes, and having an output port connected to the corresponding row electrode.

9. The wearable display apparatus as claimed in claim 1, wherein the display control unit includes:
a row electrode driving unit selecting the row electrodes and outputting image information;
a column electrode driving unit sequentially activating the column electrodes; and
a drive control unit controlling the row electrode driving unit and the column electrode driving unit to write image data to the row and column electrodes corresponding to the view display position adjustment information.

10. The wearable display apparatus as claimed in claim 9, wherein the row electrode driving unit comprises:
a plurality of flip-flops connected in series, each of the plurality of flip-flops corresponding to one of the row electrodes; and
a switch unit mounted to output to the corresponding row electrodes, image signals outputted from the drive control unit according to a signal outputted from an output port of the corresponding one of the plurality of flip-flops.

11. An apparatus comprising:
display units display-processing image information inputted to an area corresponding to a view display position adjustment information of a main control unit to view on the display units,
wherein each display unit comprises:
a matrix display unit displaying pixel information by selective driving of row electrodes and column electrodes, the row electrodes being arranged along a horizontal direction, and the column electrodes being arranged along a direction crossed at an angle with respect to the horizontal direction,
a display control unit selectively driving the row electrodes and the column electrodes to display the image at a view display position corresponding to the view display position adjustment information, and
the main control unit adjusts an image display position based on the view display position adjustment information,
wherein the view display position adjustment information corresponds to inputted interpupillary distance setting information indicative of an interpupillary distance between left and right eyes of a user.

12. An apparatus according to claim 11, wherein the interpupillary distance setting information for the user is set without movements of an optic system.

* * * * *